United States Patent
Zaitsev

(10) Patent No.: US 8,769,657 B2
(45) Date of Patent: Jul. 1, 2014

(54) SYSTEM AND METHOD FOR CONTROLLING USER'S ACCESS TO PROTECTED RESOURCES USING MULTI-LEVEL AUTHENTICATION

(75) Inventor: Oleg V. Zaitsev, Moscow (RU)

(73) Assignee: Kaspersky Lab ZAO, Moscow (RU)

( * ) Notice: Subject to any disclaimer, the term of this patent is extended or adjusted under 35 U.S.C. 154(b) by 0 days.

(21) Appl. No.: 13/620,770

(22) Filed: Sep. 15, 2012

(65) Prior Publication Data

US 2014/0047531 A1 Feb. 13, 2014

(30) Foreign Application Priority Data

Aug. 10, 2012 (RU) ................................ 2012134243

(51) Int. Cl.
| | |
|---|---|
| *H04N 7/16* | (2011.01) |
| *H04L 29/06* | (2006.01) |
| *G06F 17/30* | (2006.01) |
| *G06F 7/04* | (2006.01) |
| *G06F 12/00* | (2006.01) |
| *G06F 12/14* | (2006.01) |
| *G06F 13/00* | (2006.01) |
| *G11C 7/00* | (2006.01) |

(52) U.S. Cl.
USPC .......... 726/9; 726/4; 726/17; 726/20; 726/27; 726/28

(58) Field of Classification Search
USPC .................... 726/4, 9, 17, 20, 27, 28
See application file for complete search history.

(56) References Cited

U.S. PATENT DOCUMENTS

| | | | |
|---|---|---|---|
| 5,629,981 A | 5/1997 | Nerlikar | |
| 6,243,039 B1 * | 6/2001 | Elliot | 342/457 |
| 6,871,063 B1 | 3/2005 | Schiffer | |
| 6,971,021 B1 | 11/2005 | Daspit et al. | |
| 7,009,561 B2 * | 3/2006 | Menache et al. | 342/463 |
| 7,142,119 B2 * | 11/2006 | Siefke et al. | 340/572.4 |

(Continued)

FOREIGN PATENT DOCUMENTS

| | | |
|---|---|---|
| EP | 1684204 A1 | 7/2006 |
| WO | 9739553 A1 | 10/1997 |

OTHER PUBLICATIONS

Employee Monitoring & HR Management Using RFID; Srinivasan et al; IEEE-2011.*

(Continued)

*Primary Examiner* — Luu Pham
*Assistant Examiner* — Jahangir Kabir
(74) *Attorney, Agent, or Firm* — Arent Fox LLP; Michael Fainberg

(57) ABSTRACT

Disclosed are systems, methods and computer program products for multi-level user authentication. In one example, method includes detecting a plug-in token connected to a device that controls user access to a protected resource; identifying one or more authorized users associated with the detected token who are authorized to access the protected resource; authenticating whether a first user requesting accessing the protected resource is associated with the detected token and authorized to access the protected resource; detecting presence of one or more wireless transponders of one or more authorized users associated with the token, including at least a transponder of the first user; and providing access to the protected resource to the first user when the first user is authenticated as an authorized user associated with the detected token and the transponder of at least the first user is detected.

17 Claims, 7 Drawing Sheets

(56) References Cited

U.S. PATENT DOCUMENTS

| | | |
|---|---|---|
| 7,209,029 B2 * | 4/2007 | Coelho et al. ............. 340/5.26 |
| 8,166,311 B1 * | 4/2012 | Smith et al. ................ 713/185 |
| 8,294,580 B2 * | 10/2012 | Witwer et al. ............ 340/572.1 |
| 2003/0110388 A1 | 6/2003 | Pavlin et al. |
| 2003/0151506 A1 * | 8/2003 | Luccketti ............... 340/539.13 |
| 2004/0250074 A1 | 12/2004 | Kilian-Kehr |
| 2005/0044424 A1 * | 2/2005 | Xydis ........................ 713/201 |
| 2005/0221798 A1 | 10/2005 | Sengupta et al. |
| 2006/0001544 A1 * | 1/2006 | Siefke et al. ............. 340/572.4 |
| 2006/0282903 A1 * | 12/2006 | Jung et al. ................... 726/27 |
| 2006/0290469 A1 * | 12/2006 | Forster et al. .............. 340/5.61 |
| 2007/0179896 A1 | 8/2007 | Elteto et al. |
| 2009/0006846 A1 | 1/2009 | Rosenblatt |
| 2009/0210942 A1 * | 8/2009 | Abel .............................. 726/20 |
| 2011/0006894 A1 * | 1/2011 | Witwer et al. .......... 340/539.11 |
| 2011/0314539 A1 * | 12/2011 | Horton ......................... 726/20 |
| 2012/0211558 A1 * | 8/2012 | Buer ........................... 235/375 |
| 2012/0240195 A1 * | 9/2012 | Weiss ............................. 726/4 |
| 2012/0284769 A1 * | 11/2012 | Dixon et al. .................... 726/1 |

OTHER PUBLICATIONS

RFID-based Quality and Safety building site improvement during execution phase ; Peinado et al; IEEE-2009.*

European Search Report from the counterpart EP Application No. 12188083.5.

* cited by examiner

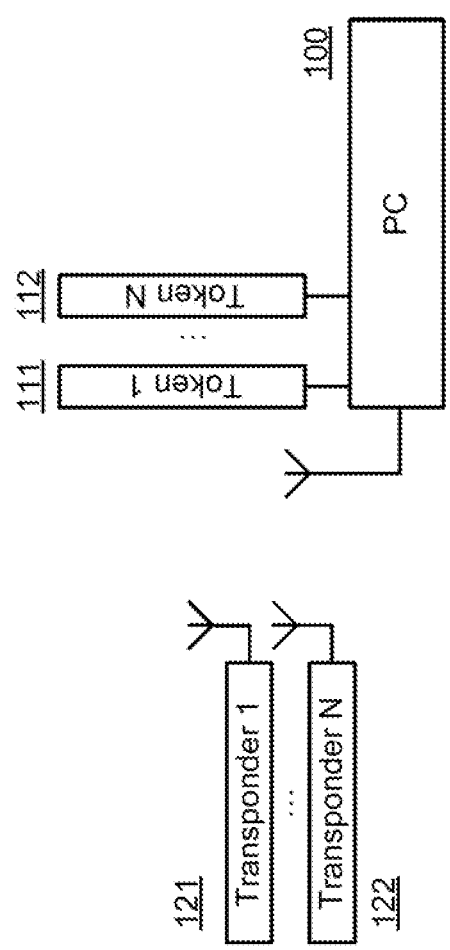

SYSTEM AND METHOD FOR CONTROLLING USER'S ACCESS TO PROTECTED RESOURCES USING MULTI-LEVEL AUTHENTICATION

CROSS-REFERENCE TO RELATED APPLICATIONS

This application claims benefit of priority under 35 U.S.C. 119(a)-(d) to a Russian Application No. 2012134243 filed on Aug. 10, 2012, which is incorporated by reference herein.

TECHNICAL FIELD

The present disclosure generally relates to the field of computer security, and specifically to systems, methods and computer program products for controlling user's access to protected devices and applications using multi-level authentication.

BACKGROUND

In our modern society, protection of information systems from unauthorized access to the system as a whole as well as to its individual components its applications and devices is getting to be more and more important. In most user authentication systems, a one-step user authentication is implemented in order to gain access to a computer, which would normally let the user to enter his/her login and a password, or a PIN code. However, for more important tasks where safety provided by the one-step authentication may be insufficient, an additional second level of authentication can be used. Such a second level can be a certain physical device owned by the user, which confirms the user's identity, such as a token or smartcard.

These devices are currently widely used in banking, and also as a way of getting remote access to internal resources of a company or an enterprise. If used correctly, such two-level authentication systems can dramatically hinder a criminal's access to a personal computer (PC) or to a company PC of the authorized user. The token should only be connected to a PC while the user is working on it. If the user leaves his workplace, he must take the token with him or at least block it. However, such rules are often neglected by users. Therefore, this technology will always have a human liability factor. For example, if the user left his workplace forgetting to take his token or his smartcard with him, a criminal may gain access to his PC. Sometimes it only takes a minute of absence for the criminal to be able to perform an unauthorized action on the user's PC, such as getting a physical or remote access to the user's PC, or installing harmful software, which would perform forbidden actions on the PC.

Situations frequently arise when multiple tokens with varying access rights to the system and to the applications and devices are connected to one PC. In a situation like that, besides a possible access by a criminal, possible unauthorized actions can be performed by authorized token users as well. For example, two tokens are connected to a PC, with one belonging to a bank accountant and another to the chief accountant. In order to activate the bank-client system components unrelated to money transactions, it is necessary to activate, i.e. to connect and enter the correct password, of the bank accountant's token. However, in order to start the bank communication application to gain permission to internet connection for payment transfers, the bank comptroller's activated token is required also. In the event that the bank comptroller stepped away from the PC forgetting to block his token or to take it with him, the accountant n unintentionally or intentionally start the bank communication application, perform money transfer transactions or perform any other action which he was not authorized to do. Such situations are rather frequent. Hence, the human factor appears to be a critical liability of the use of the two-level authentication. Notably, many kinds of tampering with client-bank systems is done exactly along the above mentioned pattern, where a user will step away from his workplace forgetting to either take his token with him or to block it.

However, one of the major problems with existing systems and methods remains the lack of full control over protected resources. Existing technologies do not avail themselves to a certain number of active tokens or transponders in order to give various access rights to different types of protected resources, such as computer devices, applications and data, as well as to permit such devices and applications to perform various actions and gain access to certain protected resources of an operating system, personal user data, cookie files, user's activity logs, or other types of protected resources. Accordingly, there is a need for a new methodology for performing multi-level authentication of users in order to prevent unauthorized access of a user or a group of users to a protected computer resource.

SUMMARY

Disclosed are systems, methods and computer program products for controlling access to protected devices and applications using multi-level user authentication. In one example embodiment, a method includes detecting a plug-in token connected to a device that controls user access to a protected resource; identifying one or more authorized users associated with the detected token who are authorized to access the protected resource; authenticating whether first user requesting accessing the protected resource is associated with the detected token and authorized to access the protected resource; detecting presence of one or more wireless transponders of one or more authorized users associated with the token, including at least a transponder of the first user; and providing access to the protected resource to the first user when the first user is authenticated as an authorized user associated with the detected token and the transponder of at least the first user is detected.

The above simplified summary of example embodiment(s) serves to provide a basic understanding of the invention. This summary is not an extensive overview of all contemplated aspects of the invention, and is intended to neither identify key or critical elements of all embodiments nor delineate the scope of any or all embodiments. Its sole purpose is to present one or more embodiments in a simplified form as a prelude to the more detailed description of the invention that follows. To the accomplishment of the foregoing, the one or more embodiments comprise the features described and particularly pointed out in the claims.

BRIEF DESCRIPTION OF THE DRAWINGS

The accompanying drawings, which are incorporated into and constitute a part of this specification, illustrate one or more example embodiments of the invention and, together with the detailed description, serve to explain their principles and implementations.

FIG. 1 illustrates one example embodiment system for controlling access to protected resources using multi-level user authentication.

DETAILED DESCRIPTION OF EXAMPLE EMBODIMENTS

Figure 2A:
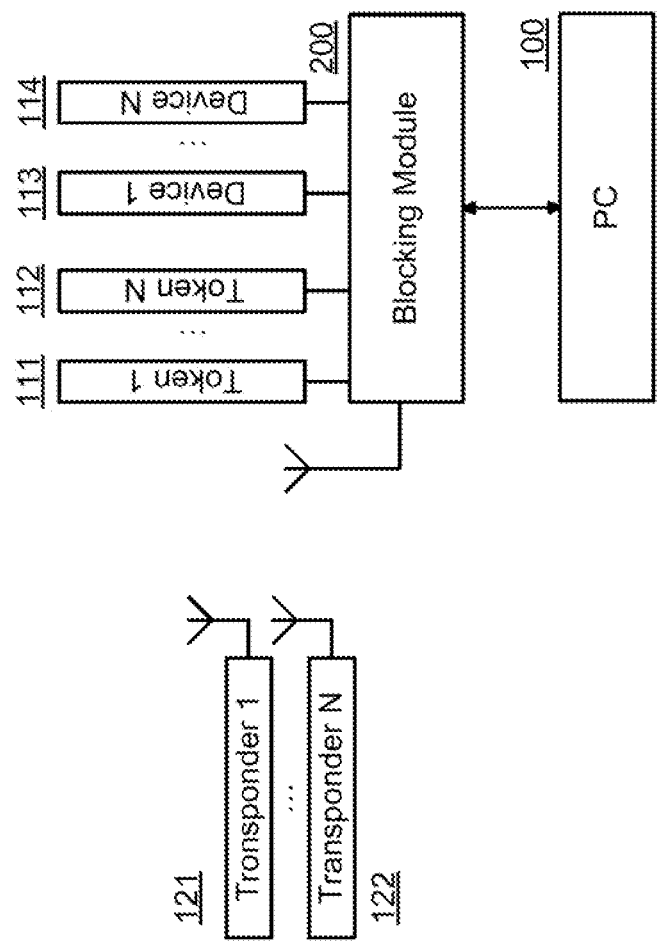
FIG. 2A illustrates another example embodiment of a system for controlling access to protected resources using multi-level user authentication.

Example embodiments of the present invention are described herein in the context of systems, methods and computer program products for using multi-level authentication to control user's access to protected resources, such as computer devices, applications and data, including, for example, certain protected resources of an operating system, personal user data, cookie files, user's activity logs, and other types of protected computer resources. Those of ordinary skill in the art will realize that the following description is illustrative only and is not intended to be in any way limiting. Other embodiments will readily suggest themselves to those skilled in the art having the benefit of this disclosure. Reference will now be made in detail to implementations of the example embodiments as illustrated in the accompanying drawings. The same reference indicators will be used to the extent possible throughout the drawings and the following description to refer to the same or like items.

FIG. 1 illustrates one example embodiment a system controlling user's access to protected resources using multi-level authentication. The system consists of one or several user tokens for authentication 111-112 (for example, tokens, smartcards) connected to computer 100 (for example, a personal computer, a notebook, a tablet), as well as one or several cordless transponders 121-122 (for example, transmitters, RFID-tags) identifying different users. Each of the transponders 121-122 may have a free form or size. It can be compact enough to fit in a user's pocket or it can be quite large. Transponder 121 can be in the form of a keychain, of an ID badge, or in any other shape or form. Moreover, transponder 121 can be attached directly to the user's skin. Such technologies, for example, include disulphide molybdenum based microchips. Molybdenum surpasses silicone, which is used in the majority of modern electronic equipment by most of its characteristics. A chip made of this material will be more flexible, will have miniature components and will consume less energy. Such molybdenum transistors can switch much faster so computer operations will be perform at a much faster rate of speed. Functionality of transponder 121 can also be built into another device, such as a mobile phone, a smart phone or a portable personal computer. In one example implementation, tokens 111-112 can have a built-in digital receiver-transmitter to maintain connection to transponders 121-122 via wireless connection (such as RFID, Bluetooth, IrDA, or any other type of wireless connection). In that case, token 111 can block or unblock itself, as well as use the rules of control of devices and applications on computer 100 based on the result of the connection to transponders 121-122.

In one example implementation, different rules may be used for different combinations of tokens and associated transponders. For example, one rule for controlling devices and applications may be applicable in the course of a connection between token 111 and transponder 121, whereas in the event of a connection between token 111 and transponder 122, another rule may apply. For reasons of reliability, the connection and authentication of transponder 121 to token 111 can be performed using various encryption systems. For example, the asymmetric encryption system can be used, in which case the connection will be two-prong (two-directional). Token 111 will generate random data and will code it with a public key of token 111. Then, it will send the coded data to transponder 121 that, in its turn, will decode the information with the help of its private key. Then, transponder 121 will code the message, into which it can introduce some changes (for example, add the transponder number, user data, the unique operation identifier), with its public key, and send it back to token 111. The token 111 will decode the data received with the help of its own private key and will perform verification. In this case, the pairs of secret keys will be generated when the token 111 is associated with the transponder 121. These secret keys can be periodically changed or updated by the system. In one example of implementation, token 111 may additionally measure the distance to the transponder 121. The distance can be measured, for example, based on measurement of the delay in reception of messages from transponder 121 and/or measurement of signal strength at the receiver of token 111. In another example of implementation, token 111 can also determine the relative location of the transponder 121 in space. In this case, token 111 or transponder 121 can have two antennas to improve space diversity and facilitate location determination.

FIG. 2A illustrates another example embodiment of the system for controlling access to protected resources using multi-level user authentication. Particularly, computer 100 can be connected to blocking module 200 (e.g., a hub, a network concentrator, a USB concentrator) performing connection to transponders 121-122. Blocking module 200 can receive commands for the PC as well as sending its own commands to the PC. In one example of implementation, blocking module 200 can be connected to one or several tokens 111-112, as well as other devices 113-114, which have proper interface for the connection (such devices can be, for example, a flash card, an external modem, or a data entry devices, such as a mouse or a keyboard). In this example, blocking and unblocking of one or several tokens, as well as application of the rules of control of devices and applications in computer 100 will be performed by blocking module 200. Blocking module 200 can also disconnect one or several devices connected to it, such as tokens 111-112, and other connected devices 113-114, as well as completely block the PC. In another example implementation, the transponder 121 can include the functionality of the token 111, thus excluding the necessity for the user to carry the two separate devices with him.

Figure 2B:
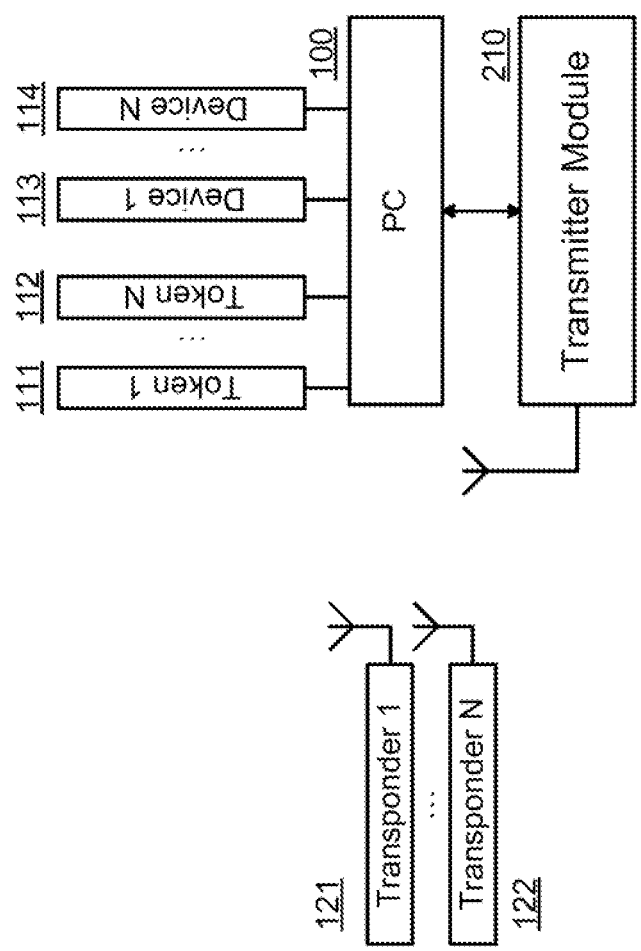
FIG. 2B illustrates another example embodiment of a system for controlling access to protected resources using multi-level user authentication.

FIG. 2B illustrates yet another example embodiment of the system for controlling access to protected resources using multi-level user authentication. Particularly, the transmitter module 210 (for example, Bluetooth or any other wireless transmitter) can be connected or built into computer 100 and used to establish a two-way connection to transponders 121-122 (for example, a transmitter or a portable device with a built-in Bluetooth module, or any other wireless module). The computer 100 is connected to one or several tokens 111-112 as well as other devices 113-114. In this example of implementation, the application installed on the computer 100 will perform blocking and unblocking of the tokens 111-112 as well as applying the rules of control of the devices and applications. This implementation of the invention does not require special hardware equipment and is simpler and cheaper to use. Another advantage of this implementation is the possibility of performing central configuration and set-up of the system. In one implementation, transponder 121 may include the functionality of token 111.

Figure 3:
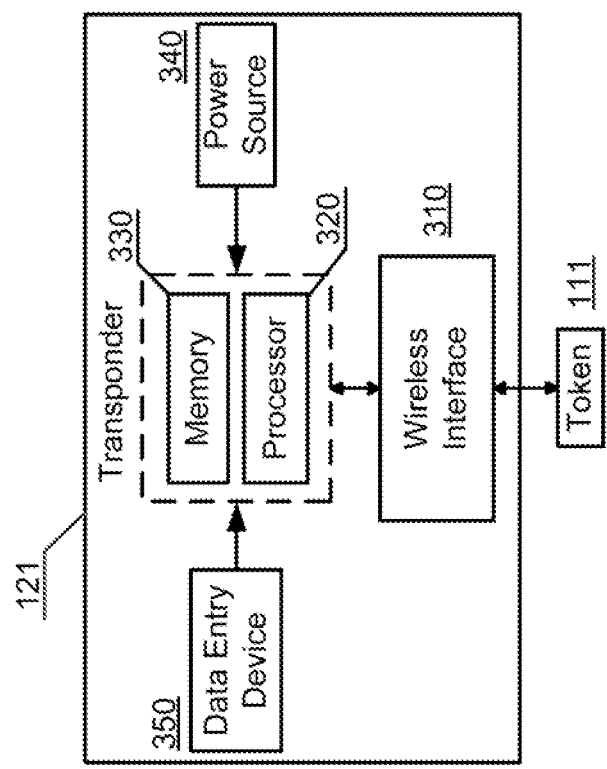
FIG. 3 illustrates one example configuration of a transponder of the present invention.

FIG. 3 illustrates an example implementation of transponder 121. Transponder 121 comprises a central processor 320 and memory module 330, and it can also include some other devices. Central processor 320 may be a co-processor, a microcontroller or any other device that has computing capabilities. Processor 320 is used to maintain system efficiency and cooperation of all components of the transponder. Memory module 330 connected to central processor 320 can be non-volatile memory, capable of storing cryptographic keys such as digital signature, a digital certificate for user authentication on one of the tokens 111-112, and other data. Memory module 330 can store all or a part of information in coded form in order to provide better safety. User authentication application can be performed on the processor 320. The transponder 121 will also include power source 340 (for example, a rechargeable cell, a Zinc-carbon battery or an alkaline battery), feeding power to the processor 320 and memory module 330 as well as the data entry device 350, that can be used to enter a password or conduct an emergency signal (such a device can be one or several keys of the keyboard, for example). The transponder will also include wireless interface 310 for connection to tokens 111-112, blocking module 200 or transmitter module 210. Wireless connection between transponders 121-122 and the above mentioned devices can be performed by way of wireless protocols such as RFID, Bluetooth, ZigBee, Wi-Fi, or any other wireless connection protocol. In one of the versions of implementation of the invention, Components 310-330 can be combined in one controller with an integrated wireless connection module.

Figure 4:
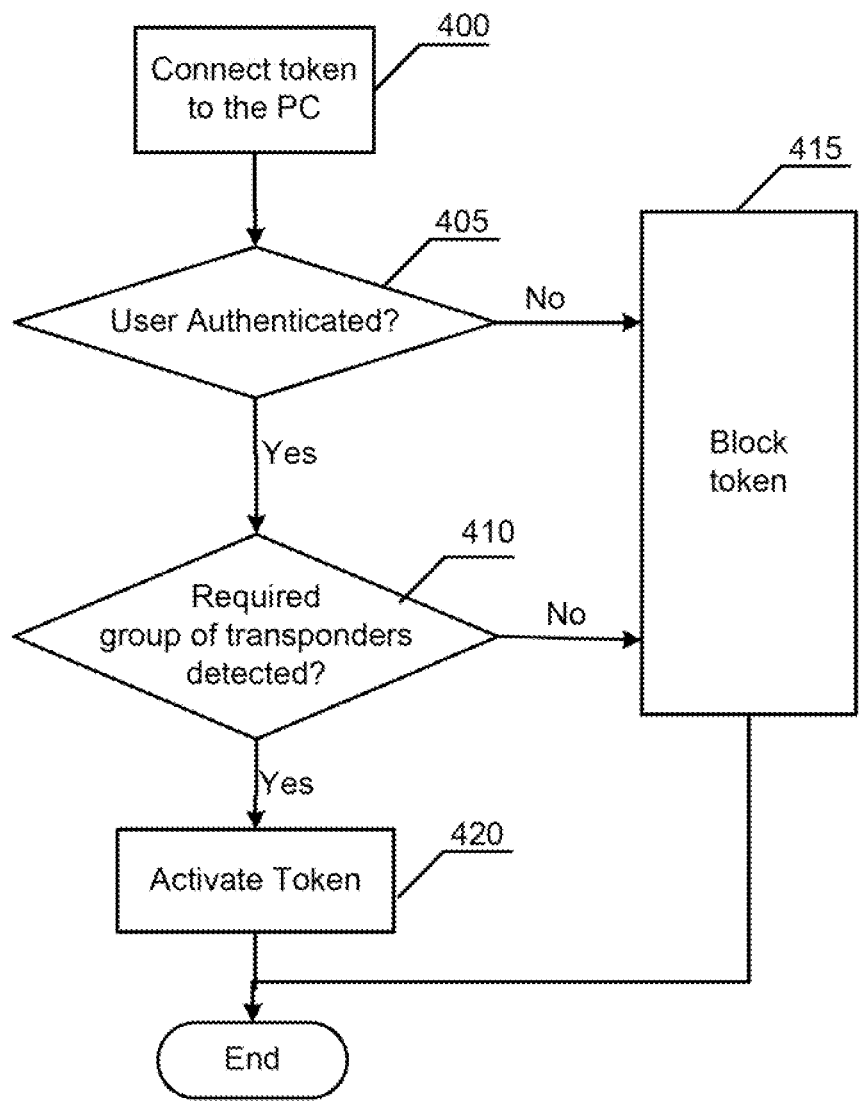
FIG. 4 illustrates one example methodology of multi-level user authentication.

FIG. 4 illustrates one example methodology of multi-level user authentication. Upon detection of a plug-in token 111 connected to computer 100 at step 400, during next step 405 authentication of one or more users of this token 111 on the computer 100 is performed. A user may be asked for a login name and password at step 405, in case it is necessary to enter such password to the computer 100. If the user is not authorized, token 111 will not be activated, and, at step 415, new rules may be applied in accordance with the conditions for applying such rules. At step 410, the connection is established with all accessible transponders, including the transponder of the authenticated user, within the reception area of the token 111, the blocking device 200 or the internal/external receiver/transmitter 210. In the event of the presence of the required group of transponders 121-122 that have access to the token 111 within the reception area of this token, upon their identification at step 420, proper rules of blocking/activation of the token 111, the computer 100 or the blocking module 200, as well as the rules for control of devices and applications are applied. Such rules depend on, for example: the presence of one or more specific transponders 121-122, or their combinations within the reception area of the computer 100, the blocking module 200, and/or one or several tokens 121-122; on the time of absence or presence of one or a combination of transponders 121-122 within the reception area of the above mentioned devices; on the current time and date; and/or on messages coming from one or several transponders 121-122. In the event of the absence of the required group of one or more transponders 121-122 within the reception area of the token 111, such token 111 will not be activated, after which the proper rules of control of devices and applications will be applied at step 415. The rules, the conditions of activation and the rule hierarchy may be established by the administrator of the computer 100. In the implementation in which transponder 121 includes the functionality of token 111, step 400 will be absent since the token functionality will be built into the transponder. User authentication of the transponder 121 will be performed at step 405 in case of its presence within the reception area of computer 100. Upon user authorization, the proper rules of blocking/activation of the computer 100 or the blocking module 200 will be applied together with the rules of control of the devices and applications.

Figure 5:
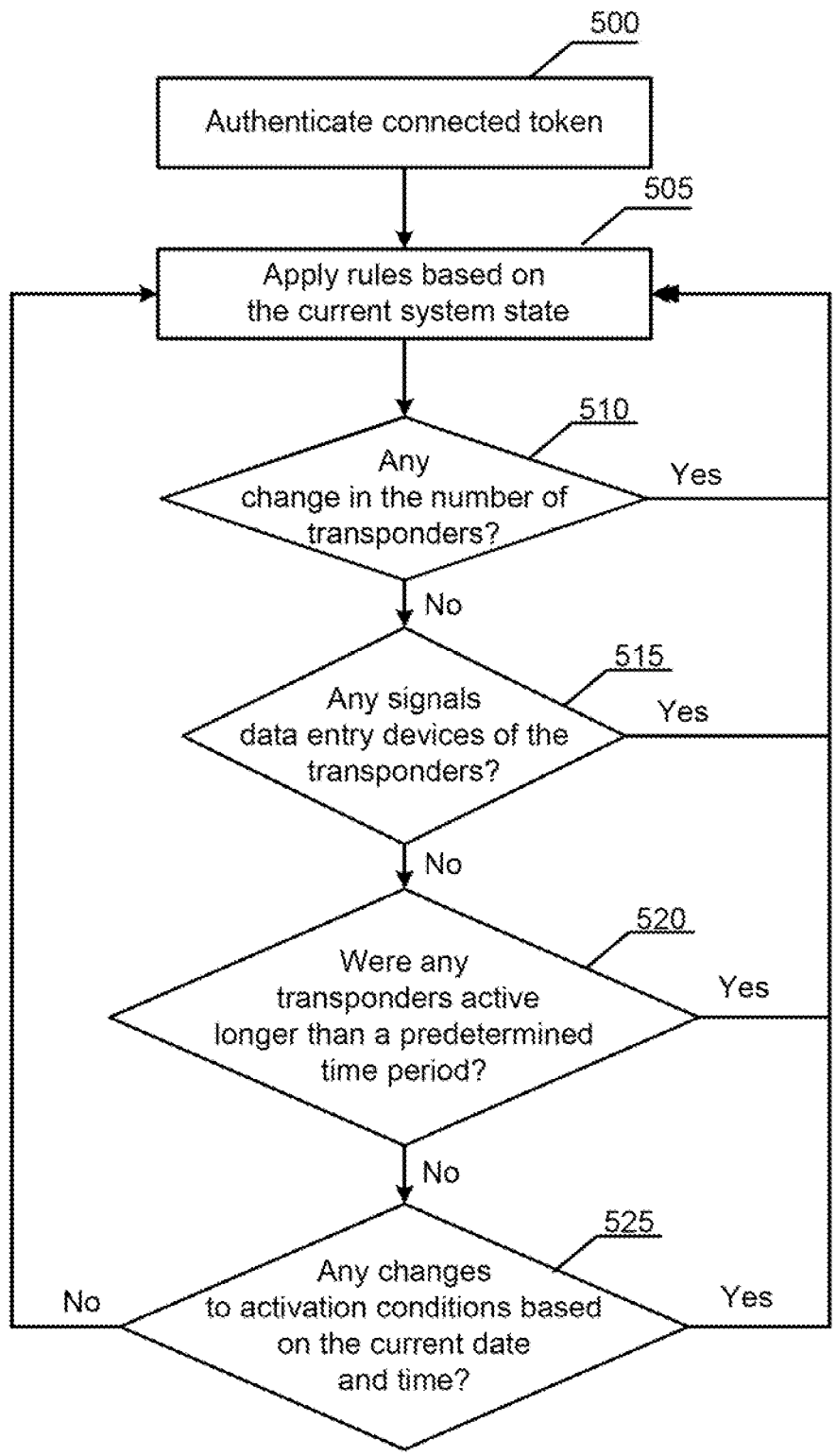
FIG. 5 illustrates one example methodology of operation of the system for controlling access to protected resources using multi-level user authentication.

FIG. 5 illustrates one example methodology of operation of the system for controlling access to protected devices and applications using multi-level user authentication. At step 500, the system perform authentication of all tokens 111-112 connected to the computer 100 with the help of the algorithm shown in FIG. 4. At step 505, the system applies the rules of control of devices and applications in accordance with the tokens 111-112 already connected to the computer and the transponders 121-122 tied to the tokens 111-112, as well as the timing and other conditions. Then, at steps 510, 515, 520, 525, monitoring of the events is performed. At step 510, the system checks for any change in number of transponders 121-122 within the reception area of token 111. In case of a change in their number at step 505, new rules of control of devices and applications may be applied. In the event that at step 510 no connection to the transponders was established due to a malfunction or to the absence of the receiver of the token 111, the computer 100, or the blocking module 210, the next step will be step 505, where the malfunctioning condition of the receiver will act as the condition of the application of the rules. In one example of implementation, the above condition can act as the condition of the absence of connection of all tokens 111-112 to all transponders 121-122, so similar rules will apply.

In another example of implementation, the rules of control of the devices and applications may additionally include generation and sending of a message to the network administrator or to the security service, since often the transmitter device glitches can be related to a malicious action. If no changes occurred at step 510, then, at step 515, a check is performed to determine if there has been any signal from the data entry device of one or several transponders 121-122. In the event that such a signal did in fact come, the proper rules are applied at step 505. If there have been no signals, at step 520 a check is performed to determine if any of the transponders 121-122 within the reception area were active longer than the predetermined time. If none of the transponders 121-122 within the reception area were active longer than the predetermined time, work will continue at step 525. If one or more of the transponders 121-122 within the reception area were active longer than a certain predetermined time period, a proper rule will be applied at step 505.

It must be noted that if, for example, there was no connection to the transponder 121 for more than 10-60 seconds, it can be assumed that transponder 121 was not active, because the user of the transponder 121 did in fact stepped away from his workstation. If, for example, the said time was less than 10-30 seconds, it can be assumed that the user of the transponder 121 did not step away and that the transponder 121 continued to be active, but there may have been breakups in the connection, or else the user did step away for a short period of time. The time of inactivity for the transponder 121 can be predetermined by the network administrator and may vary for different transponders, or it may vary depending on the time or date as well as on other conditions. At step 525, a check is performed to determine if the current date and time have changed, so that new rules of control of devices and applications can be applied. In the event that, based on the current date and time, a new rule must be applied, it will be applied at step 505. Otherwise, the monitoring will continue at step 510. As an example of such a rule can be blocking of the user's access to computer 100 and generating a message to the security service, if the transponder of the supervising use (e.g., chief bank accountant) has been within the reception area of the token for more than 8 hours running, since such a situation would be atypical and may be the result of fraudulent actions by the supervising user (e.g., chief bank accountant). In the above mentioned example, occurrences of the absence of the connection to the transponder for less than a certain predetermined time period may not be considered as the absence of the transponder within the reception area, meaning that a short absence of connection (e.g., less than 10-30 seconds) can be caused by breaks in the connection or a short-time absence of the user from his workplace.

In one example of implementation, one additional step can be added in order to determine the distance to transponders 121-122. Also, another step can be added, during which the determination of the relative location of transponders 121-122 will be performed. In this case, the rules of control of devices and applications applied at step 505 can also include the conditions of application of the rules, such as the distance from the token 111 to the transponder 121, or to a group of the transponders 121-122 (in the event that the proper transponders 121-122 are within the reception area of the token 111), or the location in space of the transponder 121 or of a group of the transponders 121-122 in relation to the token 111, as well as all possible combinations of the above mentioned conditions of applying the rules of the control of the devices and applications (for example, the current day of the week and current distance to the transponder). It must be noted that in the event of the connection of a new token to the computer, or in the event of disconnection of one of the tokens, monitoring of the events occurring at steps 510, 515, 520, 525 can be performed along with the token authentication procedure performed at steps 400-420, because in some cases the aforementioned authentication may take a long time (for example, when the user takes a long time entering the password), during which time some events may occur (for example, connection or disconnection of a new transponder, etc.). Also, along with this event, the authentication of several tokens to computer 100 or to blocking module 200 can be performed.

Table 1 below shows an example of rules for controlling access to protected resources, such as devices, applications and data.

| Priority | Application of rules | Rules |
| --- | --- | --- |
| 0 | Always | Allow execution of application [operational system component] |
| 1 | Always | Allow execution of application [Microsoft Office] |
| 2 | Always | Allow execution of application [1C] |
| 3 | Lunch time | Allow execution of application [Solitaire, Miner] |
| 4 | Business hours + transponder of Accountant Smith within reception area of the token | Allow execution of application [Client Sberbank] |
| 5 | Business hours + transponder of Accountant Smith or Jones within reception area of token | Allow execution of application [Client Bank of Moscow] |
| 6 | Transponder of Chief Accountant is within reception area of the token | Allow execution of application [Client Sberbank, Client Bank of Moscow] |
| 7 | Always | Forbid everyone everything |

At step 505, the system analyzes he table of the rules of the control of the devices and applications (e.g. Table 1). A search for a rule will be prioritized (in our case, 0 bill be the top priority). First, the system checks the conditions for application of the rule, if any. In the event that there is in fact a condition of the application of the rule, and it is not abided by, the rule is skipped and the next rule in the priority chain is taken. In the event that there is no condition of the application of the rule (the example shown in Table 1 has the condition 'always' in such case), or else if it is there and is being abided by, then the rule is applied and a check is run to see, if it is abided by or not. If it is abided by, then it means that the rule has an action associated with it (for example, to allow activation of an application, to forbid activation of an application or to send an inquiry to the network administrator, etc.) that is supposed to be performed by the system.

In the event that a rule is not applied (i.e. no action is associated with the rule), then no action is performed. Then the next rule in the chain of priority will be considered. The search will be ended in the event that the rule under consideration is the last in the table (usually the last rule will not be associated with a condition of the application of the rule or any checkups, i.e. is as following: "allow/forbid any action to all users always"). In this case, the last rule will only be applied in the event that no other rule has been applied. In one example of implementation, stationary rules can be applied, i.e. such rules that are checked at all times (in the Table 1, it is the rules with Priority 0-2). In the example in question in the Table 1 at the time PC is started, Rules 0-2 will be applied at the same time, which would allow for starting the component of the operating system and two applications, namely, Microsoft Office and application 1C. When lunch time comes (this event will be determined at step 525 at step 505 a search will be conducted in Table 1, where the rule with Priority 3 will be found and applied.

In Table 1, the rules with Priorities 0-2 will be used in order for the computer to be booted and also so that a necessary minimum of actions can be performed. The rule with Priority 3 is an example of a time-based condition for application of the rules of control of devices and applications. The Rules 4-5 are examples of the rules with the conditions dependent on time and the presence of a transponder within the reception area of the token. At this point, the Rule 6 will work along with the Rules 4-5 (either one of the Rules 4-5 will be applied, if an accountant user is at work, or else the Rule 6 will be applied, if the transponder of the accountant user is within the reception area of the transponder of the chief accountant). The Rule 7 will block access to all applications and devices for all authorized users at any time and will be applied in the event that the Rules 0-6 have not been applied.

Table 2 below shows another example of rules for controlling access to protected resources, such as devices, applications and data.

| Priority | Application of rules | Rules |
|---|---|---|
| 0 | Always | Allow execution of application [operational system component] |
| 1 | Always | Allow execution of application [Microsoft Office] |
| 2 | Always | Allow execution of application [1C] |
| 3 | Lunch time | Allow execution of application [Solitaire, Miner] |
| 4 | No transponder of Chief Accountant within reception area of the token | Forbid everyone all |
| 5 | Business hours + transponder of Accountant Smith is within reception area of the token | Allow execution of application [Client Sberbank] |
| 6 | Business hours + transponders of Accountant Smith or Jones within reception area of the token | Allow execution of application [Client Bank of Moscow] |
| 7 | Always | Forbid everyone all |

As compared to the Table 1, the Table 2 includes new rule with Priority 4 and the rule with Priority 6 is removed from the table. The Rule 4 demonstrates the logic of forbidding access by any user to the protected resource in the absence of the transponder of the supervising user (e.g., chief accountant) within the reception area of the token. In that case neither accountant will be able to work in the Client-Bank system the absence of the chief bank accountant. Particularly, the system may operate in the following manner. Initially, the system will identify one or more authorized users associated with the token, including identifying a supervising user. The system will then search for and detect transponders of all users associated with the token, including a transponder of the supervising user. Lastly, the system will provide access to the protected resource to all detected user only when transponder of the supervising user was detected within the reception area of the token.

It must be noted that the Tables of the rules of control of the devices and applications may include additional columns not shown in the above illustrated examples. Also, actions associated with a rule may additionally forbid or allow user or a group of users access to the computer devices. In one example of implementation, such devices can be various media, such as hard drives, removable drives, tape data, CDs/DVDs, devices for transmission of data, e.g., modem, devices for translating digital data into physical data, e.g. printers, or interfaces that are used to connect devices to the computer (for example, USB, Bluetooth, IrDA). Such actions under the rules of control of devices and applications can schedule and control access of the programs to the personal user data, resources of the operating system, and other types of protected computer resources. Such data can be user files (e.g., My Documents folder in Windows OS, cookie files, user activity logs, etc.), as well as the files, folders and registry keys containing work parameters and important information of frequently used programs. Also, actions under the rules of control of devices and applications can regulate the start by the user of the operating system and different applications installed on the PC.

Figure 6:
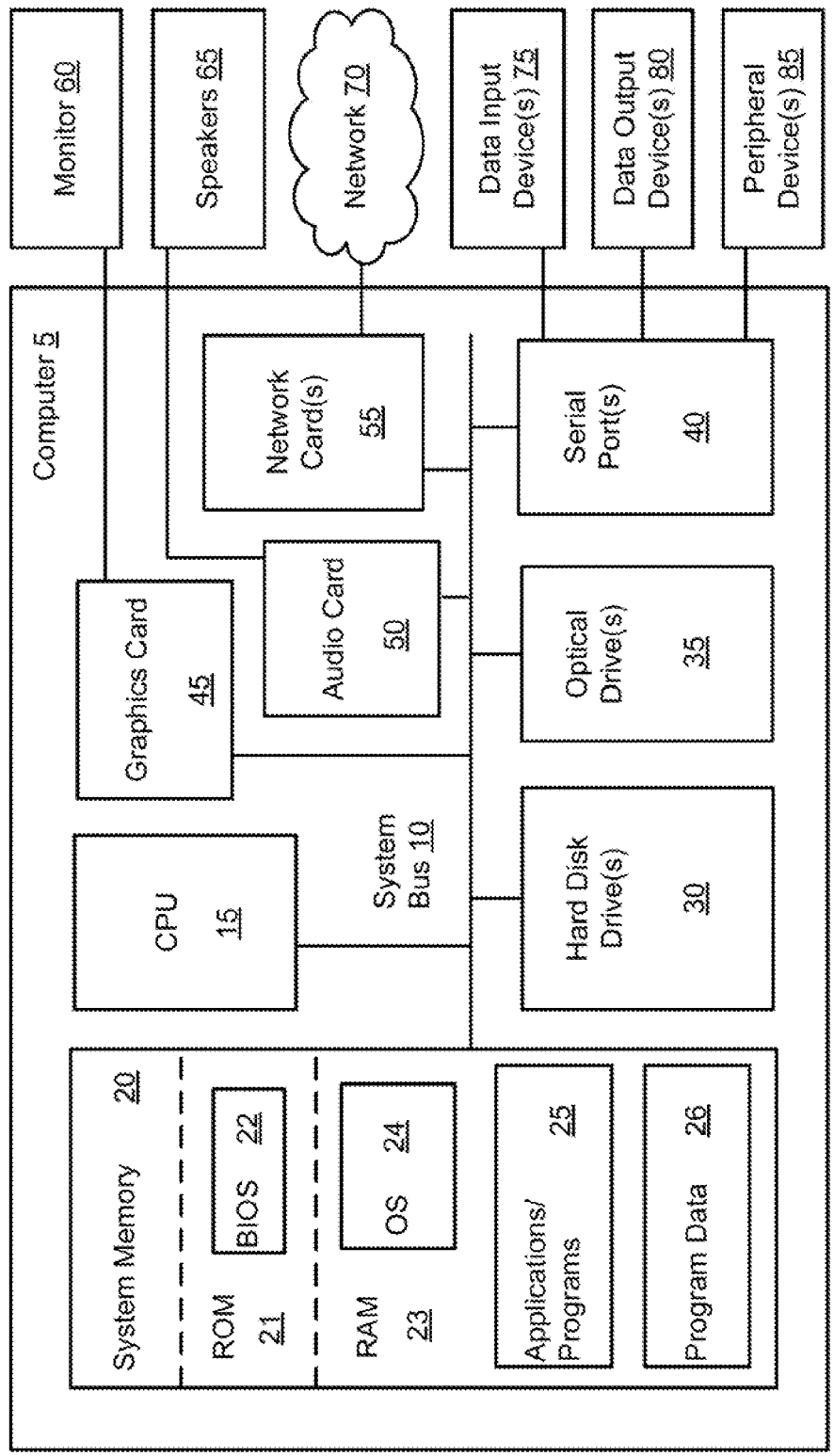
FIG. 6 illustrates a block diagram of a general-purpose computer suitable for implementing the system for controlling access to protected resources of the present invention.

FIG. 6 depicts one example embodiment of a computer system 5, which could be used to implement the system for multi-level authentication of users. As shown, computer system 5 may include one or more hardware processors 15, memory 20, one or more hard disk drive(s) 30, optical drive(s) 35, serial port(s) 40, graphics card 45, audio card 50 and network card(s) 55 connected by system bus 10. System bus 10 may be any of several types of bus structures including a memory bus car memory controller, a peripheral bus and a local bus using any of a variety of known bus architectures. Processor 15 may include one or more Inter® Core 2 Quad 2.33 GHz processors or other type of microprocessor.

System memory 20 may include a read only memory (ROM) 21 and random access memory (RAM) 23, Memory 20 may be implemented as in DRAM (dynamic RAM), EPROM, EEPROM, Flash or other type of memory architecture. ROM 21 stores a basic input/output system 22 (BIOS), containing the basic routines that help to transfer information between the components of computer system 5, such as during start-up. RAM 23 stores operating system 24 (OS) such as Windows® XP Professional or other type of operating system, that is responsible for management and coordination of processes and allocation and sharing of hardware resources in computer system 5. Memory 20 also stores applications and programs 25. Memory 20 also stores various runtime data 26 used by programs 25.

Computer system 5 may further include hard disk drive(s) 30, such as SATA magnetic hard disk drive (HDD), and optical disk drive(s) 35 for reading from or writing to a removable optical disk, such as CD-ROM, DVD-ROM or other optical media. Drives 30 and 35 and their associated computer-readable media provide non-volatile storage of computer readable instructions, data structures, applications and program modules/subroutines that implement algorithms and methods disclosed herein. Although the exemplary computer system 5 employs magnetic and optical disks, it should be appreciated by those skilled in the art that other types of computer readable media that can store data accessible by a computer system 5, such as magnetic cassettes, flash memory cards, digital video disks, RAMs, ROMs, EPROMs and other types of memory may also be used in alternative embodiments of the computer system 5.

Computer system 5 further includes a plurality of serial ports 40, such as Universal Serial Bus (USB), for connecting data input device(s) 75, such as keyboard, mouse, touch pad and other. Serial ports 40 may be also be used to connect data output device(s) 80, such as printer, scanner and other, as well as other peripheral device(s) 85, such as external data storage devices and the like. System 5 may also include graphics card 45, such as nVidia® GeForce® GT 240M or other video card, for interfacing with a monitor 60 or other video reproduction device. System 5 may also include an audio card 50 for reproducing sound via internal or external speakers 65. In addition, system 5 may include network card(s) 55, such as Ethernet, WiFi, GSM, Bluetooth or other wired, wireless, or cellular network interface for connecting computer system 5 to network 70, such as the internet.

In various embodiments, the algorithms and methods described herein may be implemented in hardware, software, firmware, or any combination thereof. If implemented in software, the functions may be stored as one or more instructions or code on a non-transitory computer-readable medium. Computer-readable medium includes both computer storage and communication medium that facilitates transfer of a computer program from one place to another. A storage medium may be any available media that can be accessed by a computer. By way of example, and not limitation, such computer-readable medium can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave are included in the definition of medium.

In the interest of clarity, not all of the routine features of the embodiments are disclosed herein. It will be appreciated that in the development of any actual implementation of the invention, numerous implementation-specific decisions must be made in order to achieve the developer specific goals, and that these specific goals will vary from one implementation to another and from one developer to another. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of limitation, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various embodiments disclosed herein encompass present and future known equivalents to the known components referred to herein by way of illustration. Moreover, while embodiments and applications have been shown and described, it would be apparent to those skilled in the art having the benefit of this disclosure that many more modifications than mentioned above are possible without departing from the inventive concepts disclosed herein.

The invention claimed is:

1. A computer-implemented method for controlling user's access to a protected resource, the method comprising:
    detecting, by a hardware processor, a plug-in token connected to a device that controls user access to the protected resource, wherein the token is associated with one or more authorized users including at least one supervising user;
    identifying one or more authorized users associated with the detected token who are authorized to access the protected resource, including identifying at least one supervising user;
    authenticating whether a first user requesting access to the protected resource is associated with the detected token and authorized to access the protected resource;
    detecting, by the hardware processor, one or more wireless transponders of one or more authorized users associated with the token, including at least a transponder of the first user and a transponder of the supervising user of said first user;
    applying a plurality of rules that specify a set of conditions under which the first user is allowed to access different types of protected resources when all the conditions are satisfied, and the first user is prohibited to access of the protected resources when at least one condition is not satisfied;
    identifying rules in response to receiving a request from the first user to access to the protected resource; and
    providing the first user to access to the protected resource, or blocking the first user to access to the protected resource based on the rules;
    wherein the conditions for the rule in accessing the protected recourse are based on accessing the protected resources during a predetermined period of the day, accessing the protected resources from a certain location, successfully authenticating the first user, and successfully detecting the transponder of the first user and of the transponder of the supervising user; and
    wherein different types of protected resources include one or more of protected applications, protected data and protected devices.

2. The method of claim 1, wherein the wireless transponder is operable to communicate wirelessly with one of the token and the device, and wherein detecting one or more wireless transponders of one or more authorized users associated with the token, includes detecting wireless signal transmissions from one or more transponders.

3. The method of claim 2, wherein wireless signal transmissions from the transponder are encrypted.

4. The method of claim 2, further comprising:
    measuring signal strength or transmission delay of the wireless signal transmission from the transponder; and
    determining approximate location of the wireless transponder based on the measured signal strength or transmission delay.

5. The method of claim 1, wherein providing access to the protected resource to the first user further includes:
    determining whether at least one of the transponder of the first user and the transponder of the supervising user was active for less or more than a predetermined period of time; and
    blocking access to the protected resource to the first user when at least one of the transponder of the first user and the transponder of the supervising user was active for less or more than a predetermined period of time.

6. The method of claim 1, wherein providing access to the protected resource to the first user further includes:
    determining whether at least one of the transponder of the first user and the transponder of the supervising user was inactive for less or more than a predetermined period of time; and
    blocking access to the protected resources to the first user when at least one of the transponder of the first user and the transponder of the supervising user was inactive for less or more than the predetermined period of time.

7. A system for controlling user's access to a protected resource, the system comprising:
    a communication interface; and
    a hardware processor coupled to the communication interface, and being configured to:
    detect a plug-in token connected to the communication interface, wherein the token is associated with one or more authorized users;
    identify one or more authorized users associated with the detected token who are authorized to access the protected resource, including identifying at least one supervising user;
    authenticate whether a first user requesting access to the protected resource is associated with the detected token and authorized to access the protected resource;
    detect one or more wireless transponders of one or more authorized users associated with the token, including at least a transponder of the first user and a transponder of the supervising user of said first user;
    apply a plurality of rules that specify a set of conditions under which the first user is allowed to access different types of protected resources when all the conditions are satisfied, and the first user prohibited to access of the protected resources when at least one condition is not satisfied;
    identify rules in response to receiving a request from the first user to access to the protected resource; and provide the first user to access to the protected resource, or block the first user to access to the protected resource based on the rules;

wherein the conditions for the rules in accessing the protected recourse are based on accessing the protected resources during a predetermined period of the day, accessing the protected resources from a certain location, successfully authenticating the first user, and successfully detecting the transponder of the first user and of the transponder of the supervising user; and wherein different types of protected resources include one or more of protected applications, protected data and protected devices.

8. The system of claim 7, wherein the wireless transponder is operable to communicate wirelessly with the token, and wherein to detect one or more wireless transponders of one or more authorized users associated with the token, the processor further configured to detect wireless signal transmissions from one or more transponders.

9. The system of claim 8, wherein wireless signal transmissions from the transponder are encrypted.

10. The system of claim 8, wherein the processor further configured to:

measure signal strength or transmission delay of the wireless signal transmission from the transponder; and determine approximate location of the wireless transponder based on the measured signal strength or transmission delay.

11. The system of claim 7, wherein to provide access to the protected resource to the first user, the processor further configured to determine whether at least one of the transponder of the first user and the transponder of the supervising user was active for less or more than a predetermined period of time; and block access to the protected resource to the first user when at least one of the transponder of the first user and the transponder of the supervising user was active for less or more than the predetermined period of time.

12. The system of claim 7, wherein to provide access to the protected resource to the first user, the processor further configured to:

determine whether at least one of the transponder of the first user and the transponder of the supervising user was inactive for less or more than a predetermined period of time; and block access to the protected resource to the first user when at least one of the transponder of the first user and the transponder of the supervising user was inactive for less or more than the predetermined period of time.

13. A computer program product stored on a non-transitory computer-readable storage medium, tile computer program product comprising computer-executable instructions for controlling user's access to a protected resource, including instructions for:

detecting a plug-in token connected to a device that controls user access to the protected resource, wherein the token is associated with one or more authorized users including at least one supervising user;

identifying one or more authorized users associated with the detected token who are authorized to access the protected resource, including identifying at least one supervising user;

authenticating whether a first user requesting access to the protected resource is associated with the detected token and authorized to access the protected resource;

detecting one or more wireless transponders of one or more authorized users associated with the token, including at least a transponder of the first user and a transponder of the supervising user of said first user;

applying a plurality of rules that specify a set of conditions under which the first user is allowed to access different types of protected resources when all the conditions are satisfied, and the first user is prohibited to access of the protected resources when at least one condition is not satisfied;

identifying rules in response to receiving a request from the first user to access to the protected resource; and providing the first user to access to the protected resource, or blocking the first user to access to the protected resource based on the rules;

wherein the conditions for the rules in accessing the protected recourse are based on accessing the protected resources during a predetermined period of the day, accessing the protected resources from a certain location, successfully authenticating the first user, and successfully detecting the transponder of the first user and of the transponder of the supervising user; and wherein different types of protected resources include one or more of protected applications, protected data and protected devices.

14. The product of claim 13, wherein the wireless transponder is operable to communicate wirelessly with one of the token and the device, and wherein detecting one or more wireless transponders of one or more authorized users associated with the token, includes detecting wireless signal transmissions from one or more transponders.

15. The product of claim 14, further comprising instructions for:

measuring signal strength or transmission delay of the wireless signal transmission from the transponder; and determining approximate location of the wireless transponder based on the measured signal strength or transmission delay.

16. The product of claim 13, wherein instructions for providing access to the protected resource to the first user include instructions for: determining whether at least one of the transponder of the first user and the transponder of the supervising use as active for less or more than a predetermined period of time; and blocking access to the protected resource to the first user when at least one of the transponder of the first user and the transponder of the supervising user was active for less or more than the predetermined period of time.

17. The product of claim 13, wherein instructions for providing access to the protected resource to the first user further include instructions for:

determining whether at least one of the transponder of the first user and the transponder of the supervising user was inactive for less or more than a predetermined period of time; and blocking access to the protected resource to the first user when at least one of the transponder of the first user and the transponder of the supervising user was active for less or more than the predetermined period of time.

* * * * *